No. 696,233. Patented Mar. 25, 1902.
W. D. GOOLD.
EMERGENCY BRAKE FOR HORSELESS CARRIAGES.
(Application filed Oct. 22, 1901.)
(No Model.)
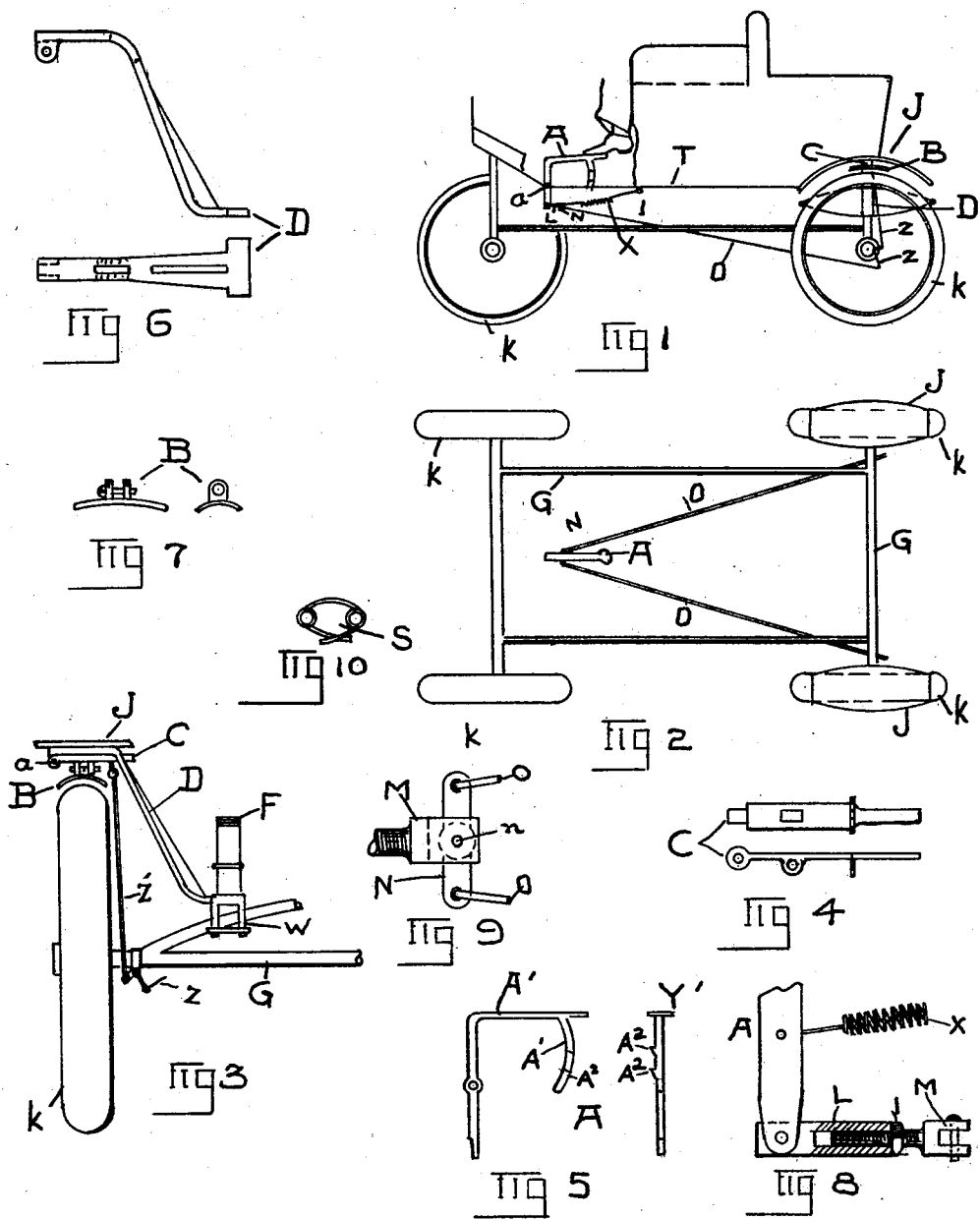
WITNESSES
Lottie Prior
Alfred A. Guthrie
INVENTOR
William D. Goold
BY Ward + Cameron
ATTORNEYS

United States Patent Office.

WILLIAM D. GOOLD, OF ALBANY, NEW YORK.

EMERGENCY-BRAKE FOR HORSELESS CARRIAGES.

SPECIFICATION forming part of Letters Patent No. 696,233, dated March 25, 1902.

Application filed October 22, 1901. Serial No. 79,529. (No model.)

*To all whom it may concern:*

Be it known that I, WILLIAM D. GOOLD, a citizen of the United States of America, and a resident of the city of Albany, county of Albany, and State of New York, have invented certain new and useful Improvements in Emergency-Brakes for Horseless Carriages, of which the following is a specification.

My invention relates to brakes upon automobiles; and the object of my invention is to provide a brake for the class of vehicles known as "horseless carriages" for use in the event of an emergency or in case the ordinary brake does not work or the vehicle becomes uncontrollable or the motive power does not work properly and to hold the vehicle stationary when desired. I attain this object by means of the mechanism illustrated in the accompanying drawings, in which—
Figure 1 is a side elevation of an automobile supplied with my brake. Fig. 2 is a plan view of the same with the body of the vehicle removed. Fig. 3 is an enlarged view of the end elevation of the rear wheel of the vehicle, showing the method of attaching the brake. Fig. 4 is a plan view and side elevation of the brake-lever. Fig. 5 is a side and end view of the foot-lever and dog attachment. Fig. 6 is a side elevation and plan view of the arm D in Figs. 1 and 3 for supporting the shoe-brake and brake-lever. Fig. 7 is a side and end elevation of the brake-shoe. Fig. 8 is a detail view of the lower end of the foot-lever. Fig. 9 is a detail view of the equalizer to which the connecting-rods are attached. Fig. 10 is a detail view of the spring attached to the brake-lever.

A is the foot-lever and is arranged at the proper position for the person driving the automobile to work by his foot. The lever A turns upon a fulcrum $a$.

B is the brake-shoe, arranged to fit upon the top of the rear wheel of the automobile.

Connected with the lower end of the lever A is a tube or sleeve L, having a thread end or jam-nut $l$.

M is a bolt or rod with threads to mesh with the threads on the jam-nut $l$ or sleeve L, so that the bolt or rod M may be screwed in and out of the sleeve L to regulate its distance from the end of the lever A. At the end of this bolt or rod M is a small equalizing-arm N, fastened by a pivot $n$ to the rod M. At the ends of this equalizing-arm N are attached the connecting-rods O O, which run under the bottom of the vehicle and connect with the bell-crank levers Z Z. To each bell-crank lever Z is attached the connecting-arm Z', the bell-crank lever Z being attached to the rear axle of the vehicle or to some stable portion of the vehicle in suitable position. The connecting-arm Z' is attached to the brake-lever C. The brake-lever C is attached to a pivot $a$, Fig. 3, and is supported over the wheel under the mud-guard or fender J by the supporting-arm D and is returned in position by the spring S.

G is the rear axle of the vehicle.

F is the carriage-spring, which sustains the body of the vehicle.

Attached to the spring-seat W is the arm D, which supports the mud-guard or fender J, and the brake-lever and brake-shoe over the wheels.

X is a spring, one end of which is attached to the foot-lever A, near the bottom, and one end to the body of the vehicle, so as to return the foot-lever A in position after it has been acted upon by the foot and has been released.

The foot-lever A is provided with a dog or arm A', which is provided with notches or catches $A^2 A^2$, Fig. 5, arranged so that when the lever A is pressed down by the foot the notches or catches on the arm A' will catch upon a plate or bar T, arranged for that purpose under the floor of the vehicle, and hold the lever in position. The lever can be readily released by a slight sidewise movement of the foot and be returned to position by the spring, as before stated.

The supporting-arm D, which holds the shoe-lever in position over the wheel, also supports a fender or mud-guard, which completely covers up the brake-shoe and the attachments connected therewith and conceals them from view, and at the same time answers all the purposes of a fender or mud-guard on an ordinary carriage.

The operation of my emergency-brake is as follows: The driver by pressing his foot upon the brake-lever A presses the upper end downward, and the lever turning upon the fulcrum $a$ throws the lower end of the lever forward. This movement will carry the connecting sleeve and rod M and L forward and the connecting-rods O O. These in turn will operate the bell-crank levers Z Z, which will pull down the connecting-arms Z' Z', which will press downward the brake-lever C C, to which are attached the brake-shoes B B, thus pressing the brake-shoes B B firmly against the tires of the wheels and holding them firmly. The notches or catches $A^2$ $A^2$ catch upon the plate T and will hold the brake upon the wheels firmly until released by the foot, and when released by the foot the spring will return the foot-lever A to its original position. The various levers and connecting-rods are so arranged as to give large power to the brake, so that in case of an emergency, such as the regular brake not acting or the motive power of the carriage not performing its functions properly, my emergency-brake may be applied with perfect safety and success. Also when it is desired to hold the vehicle stationary in one position for any reason my brake can be set as above described, and it will hold until released. The dog or arm having several notches or catches, the brake can be set as solidly or lightly as desired.

When arranged in the manner herein shown, it will be practically invisible, and with the fenders, as stated, will add to the beauty and utility of the vehicle to which it is attached.

What I claim as my invention, and desire to secure by Letters Patent, is—

1. In a brake for a horseless carriage, a foot-lever adapted to be operated by the driver of said carriage, an arm attached to the upper end of said lever and provided with ratchet-teeth, adapted to catch upon a stationary plate or bar under the floor of said carriage; said stationary plate or bar adapted to be acted upon by said ratchet-teeth; an adjustable arm connected with the lower end of said lever; an equalizing-bar pivoted at the center to the end of said adjustable arm; connecting-rods connecting the ends of said equalizing-bar to bell-crank levers at the rear of said carriage; said bell-crank levers adapted to operate other connecting-arms; said last-named connecting-arms connecting said bell-crank levers with brake-levers over the rear wheels of said carriage; said brake-levers supported over the rear wheels of said carriage by arms from the body portion of said carriage, and adapted to press brake-shoes upon the tires of the wheels of said carriage; said brake-shoes attached to said brake-levers and adapted to act upon the tires of said wheels, all substantially as described and for the purpose set forth.

2. In a brake for an automobile; a brake-shoe adapted to act upon the tire of a wheel of the automobile; a brake-lever supported over said wheel by an arm from the body portion of said vehicle; a mud-guard or fender also supported by said arm and covering said brake-shoe, and brake-lever, and substantially concealing them from view; a spring attached to said brake-lever and to said fender and adapted to hold said brake-shoe up under said fender away from contact with said wheel when not in action; said brake-lever attached to said brake-shoe and adapted to press it down upon the tire of the wheel; together with means for operating said brake-lever by the driver of said automobile, substantially as described and for the purpose set forth.

Signed at Albany, New York, this 3d day of October, 1901.

WILLIAM D. GOOLD.

Witnesses:
 WALTER E. WARD,
 LOWRY D. STEWART.